Figure 1:
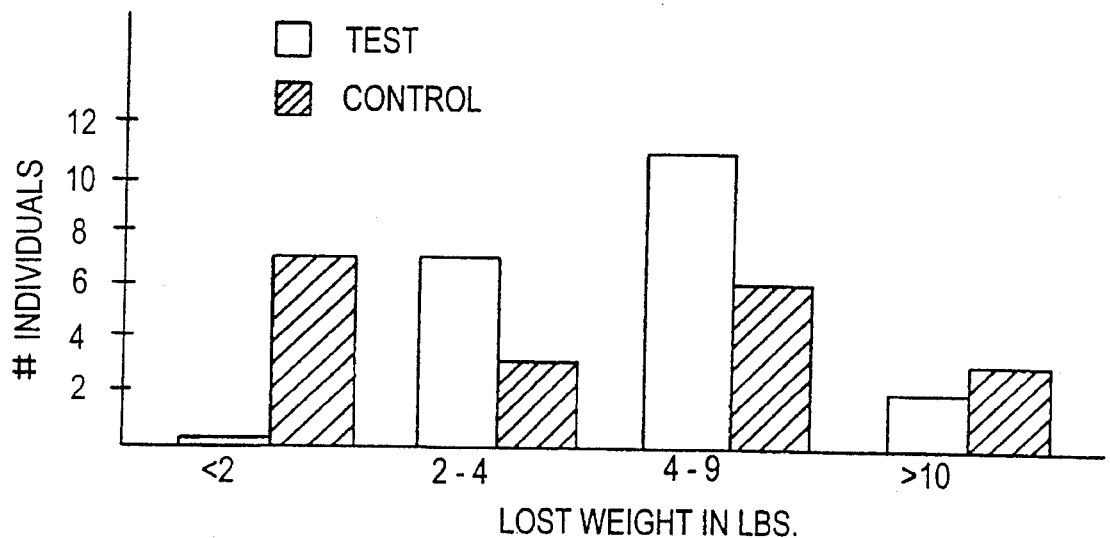

US005595772A

United States Patent [19]
Wurtman et al.

[11] Patent Number: 5,595,772
[45] Date of Patent: Jan. 21, 1997

[54] COMPOSITION AND METHODS FOR LOSING WEIGHT

[75] Inventors: Judith J. Wurtman; Richard J. Wurtman, both of Boston, Mass.

[73] Assignee: Massachusetts Institute of Technology, Cambridge, Mass.

[21] Appl. No.: 481,624

[22] Filed: Jun. 7, 1995

[51] Int. Cl.$^6$ .................................................. A23L 1/29
[52] U.S. Cl. .............................. 426/2; 426/106; 426/656; 426/658; 426/648; 426/804; 426/810
[58] Field of Search ..................................... 426/106, 656, 426/658, 648, 804, 810, 2

[56] References Cited

U.S. PATENT DOCUMENTS

| | | |
|---|---|---|
| 3,867,523 | 2/1975 | Bahal . |
| 4,089,944 | 5/1978 | Thomas . |
| 4,182,860 | 1/1980 | Naslund et al. . |
| 4,344,968 | 8/1982 | Aoda et al. . |
| 4,591,559 | 5/1986 | Liu et al. . |
| 4,687,763 | 8/1987 | Wurtman . |
| 5,206,218 | 4/1993 | Wurtman et al. ........................... 514/2 |
| 5,223,540 | 6/1993 | Wurtman et al. . |
| 5,266,333 | 11/1993 | Cady et al. . |

OTHER PUBLICATIONS

McNair, et al., *Profile of Mood States Manual (POMS)* (1971–1981), San Diego Educational and Industrial Testing Service.
Wurtman, J. J., *J. Clin. Psychiatry*, (1988) 49(8):37–39.
Smith, S. L., et al., *Psychosomatic Medicine*, (1969) 31:281–287.
Abraham, G. E., et al., *J. Reprod. Med.*, (1987) 32:405–422.
Wurtman, J. J., et al., *Am. J. Obstet. Gynecol.*, (1989) 161:1228–1234.
Abraham, G., *Current Progress in Obstet. and Gynecol.*, (1980), 3:5–39.
Steiner, M., *Clin. Obstet. Gynecol.*, (1992) 35:599–611.
Wood, S. H., et al., *Obstet. Gynecol.*, (1992) 80:339–44.
Bancroft, J., et al., *Psycho. Med.*, (1988) 18:855–860.
Brzezinski, A. et al., *Obstet. Gynecol.*, (1990) 76:206–301.
Elia, D., et al. *Revue Francaise de Gynecologie ed d'Obstetrique*, (1992) 87:361–369.
Elks, M., *Southern Med. J.*, (1993) 86:503–507.
Stone, A. B., et al., *Psychopharmacol. Bull.*, (1990) 26:331–335.
Stone, A. B., et al., *J. Clin. Psychiatry*, (1991) 52:290–293.
Bancroft, J., et al., *Psychosomatic Medicine*, (1993) 55:133–145.
Fernstrom, J., et al., *Science*, (1971), 178:414–416.
Mortola, J.,et al., *Obstet Gynecol.*, (1990) 76:302–307.
Endicott, J., et al., *Psychopharmacol. Bull.*, (1982) 18(3):121–123.
Shader, R. I., et al., *Psychopharmacol. Bull.*, (1982) 18(3):113–121.
Gronwall, D., et al., *J. of Neurology, Neurosurgery and Psychiatry*, (1981) 44:889–895.
Keenan, P., et al., *Psychoneuro-endocrinology*, (1992) 17:179–187.
Brugger, P. et al., *Percept Mot Skills*, (1993), 77:915–921.
Menkes, D., et al., *J. of Affective Disorders*, (1994) 20:1–7.
Boyer, W., *Clin. Psychopharmacology*, (1992) 6:5–12.
Lieberman, et al., *Am. J. Clin. Nutr.*, (1986) 44:772–8.

(List continued on next page.)

*Primary Examiner*—Helen Pratt
*Attorney, Agent, or Firm*—Lowe, Price, LeBlanc & Becker

[57] ABSTRACT

Compositions and methods of losing weight are described in which an individual's daily caloric intake is limited to about 1600 calories or less, where the calories are provided by at least some form of carbohydrate intake and at least some form of protein intake, provided that about 40 percent or more of the protein intake is consumed at breakfast. The relative amounts of carbohydrate and protein ideally suited for each meal of the weight loss plan are described. Food packages include meals for at least one breakfast composition, at least one lunch or dinner composition, and at least one snack composition and, optionally may include, a traditional meal of a prescribed range of caloric and nutritional content to be consumed either at lunch or dinner.

33 Claims, 1 Drawing Sheet

OTHER PUBLICATIONS

O'Rourke, D. J. *Clin. Psychiatry*, (1989) 50:343–347.
Rosenthal, N., et al., *Biol. Psychiatry*, (1989) 25:1029–1040.
Reid, R., *Curr. Probl. Obstet. Gynecol. Fertil.*, (1985) 8:1–5.
Lyons, P. M., et al., *Am. J. Clin. Nutr.*, (1988) 47:433–39.
Boyd, N. F., et al., *The Lancet*, (1988), pp. 128–132.
Moller, S. E., *Pharmacol. Toxicol.* 71, Suppl. 1 (1992) 61–71.
Hartmann, M. K., et al., *Sleep 1978*, Fourth European Congress on Sleep Research, Tirgu–Mures, (1978), pp. 385–390.
Porter, J. M., et al., *Sleep 1980*, Fifth European Congress on Sleep Research, Amsterdam, (1980), pp. 408–410.
Wurtman, J. J., *Clinical Neuropharmacology*, (1988), vol. 11, Suppl. 1, pp. S139–S145.
Wurtman, J. J., *Appetite*, (1987) 8:211–213.
Wurtman, R. J., et al., *Appetite*, (1986) 7:99–103.
Wurtman, J. J., *Annals N.Y. Acad. of Sci.*, (1985), 443–145–51.
Wurtman, J. J., *J. of the American Dietetic Assoc.*, (1984) 84(9):1004–1007.
Spring, B., et al., *J. Psychiat. Res.*, (1982) 17(2):155–67.
Heraief, E., et al., *J. Neural Transmission*, (1983) 57:187–195.
Wurtman, J. J., et al., *Neuropsychopharmacology*, (1993), vol. 9, No. 3, pp. 201–210.
Wurtman, R. J., et al., *The Biology of Feast and Famine*, Academic Press, pp. 151–156.
Wurtman, J. J., et al., *Current Med. Res. and Opinion*, vol. 6, Suppl. 1, (1979), pp. 28–33.
Wurtman, J. J., *Drugs*, (1990) 39(3):49–52.
Spellacy, W. N., et al., *J. Reproductive Medicine*, (1990), pp. 508–511.
Spring, B., et al., *Nutr. Health*, (1984), 3:(1–2)55–67.
Porter, J. M., et al., *Electroencephalography & Clin. Neurophysiology*, (1981) 51:426–433.
Neumann, M., et al., *Perceptual and Motor Skills*, (1992) 75:873–874.
Francart, A.–L., et al., *C. R. Soc. Biol.*, (1989) 183:467–473.
Hurni, M., et al., *Br. J. Nutr.*, (1982) 47(1):33–44.
Pollet, P., et al., *Int. Vitam. Nutr. Res.*, (1983) p. 223.
Hartmann, M. K., et al., *Waking and Sleeping*, (1979) 3:63–68.
BOOK: Smith, S., et al., *Modern Management of Premenstrual Syndrome*, Norton Medical Books, W. W. Norton & Co. (1993) (Copy not included in references).
McNair, D., et al., *Profile of Mood States*, San Diego, CA Educational Testing Service (1971) pp. 3–23.

COMPOSITION AND METHODS FOR LOSING WEIGHT

I. FIELD OF THE INVENTION

The present invention relates to compositions and methods of losing weight. A weight loss diet plan is described relating to the daily consumption of a breakfast, lunch, snack, and dinner meals of a prescribed range of caloric and nutrient content.

II. BACKGROUND OF THE INVENTION

Obesity continues to remain a serious health concern in modern society. Medical science has long appreciated the fact that obese individuals are more prone to suffering from cardiac problems, high blood pressure, and kidney ailments, not to mention diabetes. It has been estimated that 34% of all Americans are obese; that is, their body weight exceeds desirable body weight (according to Metropolitan Life Insurance Company tables) by 20% or more. In addition to suffering a disproportionate amount of physical ailments, obese individuals may also suffer psychologically under constant commercial media bombardment of "beautiful" people being skinny and svelte. Indeed, obese people may even suffer a social stigma simply from their appearance.

Overweight and obese individuals, recognizing the medical disadvantages and socially conscious of their excessive weight, have long sought ways of shedding their excess weight. While a combination of a reasonable diet and exercise may be best, most individuals tend to subscribe to one diet plan after the next in a vain effort to lose weight. And, as anyone who has tried any of the numerous diet plans available has experienced, the craving for food while on a diet can be quite acute and the urge to stray from the dietary regimen constant. Hence, any one individual on a diet may not necessarily lose weight over the course of a diet and a population of individuals on a given diet may experience a very large spread among individuals losing some weight (less than 2 pounds), a moderate amount of weight (between 2–9 pounds), and a considerable amount of weight (over 10 pounds).

Thus, there remains a need in the art for compositions and methods of losing weight which provide a more desirable weight loss distribution profile among a population of individuals and which specifically address a carbohydrate craving universally complained of by individuals on a diet, as well as increasing the feeling of well being and self-reported vigor among these affected individuals.

III. SUMMARY OF THE INVENTION

Accordingly, it has been discovered that obese individuals subscribing to the weight loss regimen of the present invention not only lose weight relative to a control group on a control diet plan, but more individuals in the test group lost a moderate amount of weight compared with the control group. Moreover, compared with the control group, the test group reported a decrease in their carbohydrate craving and an increase in their self-reported vigor. In one embodiment of the present invention, a breakfast, lunch, and snack were provided in powdered form and reconstituted with either water, diet soda, or coffee. The lunch meal can also be consumed for dinner or, if desired, the dinner meal can be composed of traditional foods, but of a predetermined range of caloric and nutritional content. Most preferably, the traditional foods should be chosen according to guidelines specifying a fixed amount of protein and carbohydrate.

In accordance with the present invention, it has been surprisingly discovered that when most of a dieting individual's daily protein intake is consumed at breakfast (that is, 40% or more of the daily protein intake), and the carbohydrate protein ratio of the balance of the day's meals are adjusted in a certain manner, the obese individuals in the diet regimen tended to lose greater amounts of weight, suffered less from carbohydrate craving, and recorded an increase in their self-reported vigor relative to obese individuals in a control group consuming a different allocation of carbohydrate and protein.

Accordingly, it is an object of the present invention to provide a package comprising a plurality of food compositions for consumption in connection with a weight loss diet plan, including at least one breakfast composition, at least one lunch or dinner composition, and at least one snack composition. In particular, the breakfast composition of the present weight loss plan comprises (a) at least one form of carbohydrate, and (b) at least one form of protein, the weight ratio in the breakfast composition of the total amount of carbohydrate to the total amount of protein ranging from about 1:10 to about 1:1. On the other hand, the lunch or dinner composition of the present invention comprises (a) at least one form of carbohydrate, and (b) at least one form of protein, the weight ratio in the composition of the total amount of carbohydrate to the total amount of protein ranging from about 5:1 to about 10:1.

Moreover, the snack composition of the present invention comprises at least one form of carbohydrate and should be substantially free of protein.

As mentioned above, the dinner meal can be composed of traditional foods but should be chosen under the guidelines specifying specific amounts of nutritious protein-rich and carbohydrate-rich foods. Therefore, in a preferred embodiment of the present invention, the breakfast composition should not elevate the post-consumption tryptophan to large neutral amino acid ratio (Tp/Lnaa ratio) in the plasma relative to pre-consumption Tp/Lnaa ratios. On the other hand, the lunch and dinner compositions should be chosen to prevent any decrease in the Tp/Lnaa ratio and/or maintain or elevate this ratio above pre-meal levels. The snack composition should be chosen to elevate post-consumption plasma Tp/Lnaa levels. As used herein, Lnaa's include amino acids having one amino group for each carboxyl group present (preferably, one of each), such as leucine, isoleucine, tyrosine, valine, phenylalanine, and tryptophan.

It is also an object of the present invention to provide a method of losing weight comprising substantially limiting an individual's daily caloric intake to no more than about 1600 calories, preferably less, which calories are provided by at least some form of carbohydrate intake and at least some form of protein intake, provided that about 40% or more of the protein intake is consumed at breakfast.

Also contemplated by the present invention is a method of losing weight comprising substantially limiting an individual's daily food intake to the contents of a package comprising a plurality of food compositions, including at least one breakfast composition, at least one lunch or dinner composition, and at least one snack composition, along with a fourth meal of traditional food content, the total daily caloric intake falling within a predetermined range. Preferably, this range is about 1100 to about 1900 calories.

It is also an object of the present invention to provide a method of achieving a more Gaussian distribution of weight loss among a population of individuals participating in a weight loss diet plan.

Yet another object of the present invention is a method of inhibiting the carbohydrate craving of an individual participating in a weight loss diet plan under guidelines specifying specific amounts of nutritious protein-rich and carbohydrate-rich foods.

These and other objects in the present invention will become apparent to one of ordinary skill in the art, upon further consideration of the balance of the present disclosure, which is provided to further assist those interested in practicing the invention.

IV. BRIEF DESCRIPTION OF THE DRAWINGS

FIG. 1 illustrates a bar graph of the number of individuals participating in either the weight loss plan of the present invention (test) or a control weight loss plan, grouped according to the amount of weight lost over a 7 week study period.

Figure 2:
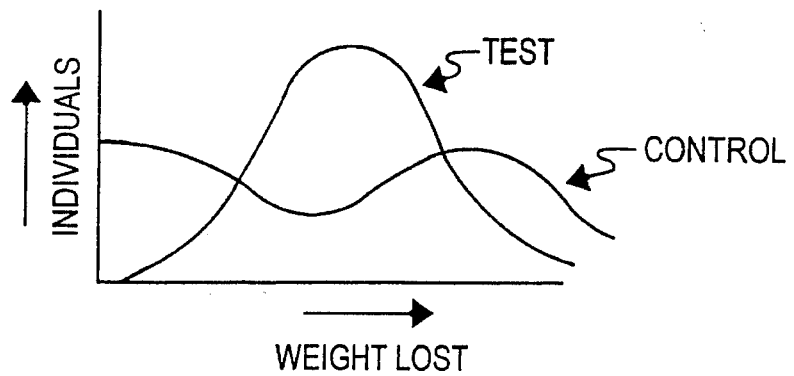

FIG. 2 provides superimposed plots of the weight loss distribution among individuals participating in the weight loss plan of the invention (test) compared with the control weight loss plan. The more Gaussian distribution of weight loss experienced by individuals participating in the weight loss plan of the present invention is easily apparent.

V. DETAILED DESCRIPTION OF THE INVENTION

The present invention is directed to compositions and methods for effecting weight loss with minimal carbohydrate craving. In particular, it has been found that the compositions of the present invention promote weight loss by limiting the ratio of carbohydrate to protein in three daily meals and in one daily snack within prescribed ranges. According to the present invention, the breakfast composition preferably has a relatively low CHO:protein ratio, for example, 4 parts by weight carbohydrate to 3 parts by weight protein. The lunch and dinner compositions, in contrast, contain a relatively high ratio of carbohydrate to protein, for example, 7 parts by weight CHO to one part by weight protein. Lastly, the daily snack composition is comprised of complex and/or simple carbohydrates, and is substantially free of protein. As used herein, the term "carbohydrate" encompasses both complex carbohydrates and simple sugars. Preferably, the carbohydrate is of a high glycemic index, such as maltodextrin, polycose (a synthetic polyglucose), dextrose, sucrose, maltose, to name a few. Other sources of carbohydrate include but are not limited to, galactose, pregelatinized starch, mannose, lactose, dextrin, and mixtures of the above. Rapidly digestible blends of carbohydrate can likewise be used.

As used herein, the term "protein" includes any high quality protein derived from an animal or plant source, and does not include basic amino acids, amino acid derivatives, or small peptides. Proteins derived from animal foods such as dairy products or eggs are suitable, including, but not limited to, whey, casein, or albumin.

Preferably, the compositions of the present invention are provided in a package containing at least one breakfast composition, at least one lunch or dinner composition, and at least one snack composition. An additional lunch or dinner composition may also be provided in the package. Alternatively, the dinner meal may be composed of traditional foods in a given range of caloric and nutritional content. In a particular embodiment of the present invention, the daily caloric intake of the individual subscribing to the weight loss plan should not exceed about 1800 calories, preferably 1600 calories, more preferably 1200 calories, and most preferably 1300–1400 calories.

Each composition provided in the package may be further comprised of additional ingredients including, but not limited to, sources of fat, fiber, calcium, and other vitamins and minerals. The compositions provided are preferably low in fat, however, with preferably less than 20% of the calories provided in the composition deriving from fat. The amount of fiber, such as methylcellulose, may also be adjusted, but preferably provides between about 20–25 grams of fiber per day.

Accordingly, it is preferred that the breakfast composition have a caloric content ranging from about 200–400 calories. The lunch and/or dinner composition having a caloric content ranging from about 300–500 calories, and the snack composition having a caloric content ranging from about 150–250 calories. Excluding the optional traditional dinner meal, the total number of calories provided in the package containing at least breakfast composition, at least one lunch or dinner composition, and at least one snack composition should preferably range from about 700 to about 1050 calories. In a specific embodiment of the present invention, the package should further include instructions for the range in the caloric and nutritional content of the optional traditional dinner meal.

The compositions of the present invention can be provided in any convenient form, including but not limited to powders, liquids, soups, food bars, pudding, and milk shakes. Natural and/or artificial flavorings can also be added, including the following flavors: chocolate, vanilla, strawberry, apple, rum, banana, orange, mocha, etc.

As discussed previously, an important aspect of the present invention is the discovery that the breakfast composition include most of the daily protein intake. Hence, because the breakfast composition will tend to be high in protein, the breakfast composition tends not to elevate the Tp/Lnaa ratio found in the plasma after consumption of the breakfast meal relative to the Tp/Lnaa ratio found in the plasma before consumption of the meal.

On the other hand, it has been discovered that the balance of the day's meals should indeed prevent a decrease in the post-consumption plasma levels of tryptophan relative to the plasma levels of large neutral amino acids; that is, the lunch and dinner meals should maintain or elevate the post-consumption Tp/Lnaa ratio in the plasma relative to the pre-consumption Tp/Lnaa ratio, and the snack meals should elevate the Tp/Lnaa ratio relative to the pre-consumption levels. Preferably, the post-consumption plasma Tp/Lnaa ratio is elevated relative to the pre-consumption plasma Tp/Lnaa ratio by about 10% or more, more preferably by 15% or more, most preferably by about 20% to about 30% or more.

Hence, the breakfast composition should provide about 40% or more of the daily protein intake, preferably about 50% or more of the daily protein intake, most preferably about 60% or more of the daily protein intake. Therefore, consistent with the objective of the present invention, the non-breakfast meal compositions should maintain Tp/Lnaa ratios at a level to permit enhanced uptake of tryptophan into the brain after the consumption of the snack. Higher levels of tryptophan in the brain after the snack is consumed, in turn, enhances the synthesis of serotonin in the brain which provides an enhanced feeling of satisfaction, well being and ability to control further food intake.

Table 1, shown below, provides an example of the caloric and nutrient content of four meals contemplated by the present weight loss diet plan.

TABLE 1

|  | Breakfast | Lunch | Snack | Dinner | Total |
|---|---|---|---|---|---|
| Calories | 325 | 350 | 210 | 430 | 1315 (a) |
| Protein (g) | 30 | 10 | — | 10 | 50 |
| Carbohydrate (g) | 40 | 70 | 45 | 70 | 225 |
| Fat (g) | 5 | 3 | 3 | 12 | 23 |
| Fiber (g) | 10 | 8 | — | + |  |

*Vitamins and Minerals: to be provided as multi vitamin/mineral pill
+ based on food choices of subjects
(a) salad and no calorie vegetables not included As one can see, of the 50 total grams of protein provided by the four meals, 30 grams are provided in the breakfast meal, 10 grams each in the lunch and dinner meals, and no protein is provided by the snack. In addition, the weight ratio of carbohydrate to protein in the lunch and dinner meals is at least 4 to 1, preferably 5 to 1, most preferably 7 to 1 or greater.

Table 2, shown below, lists the calorie and nutrient content of the control diet plan which provides a total number of calories similar to that provided by the weight loss plan of the present invention. This control diet plan, typical of most commercially available diet plans, contains a carbohydrate to protein weight ratio no higher than about 3 to 1 and would provide most of the daily protein intake after breakfast.

TABLE 2

|  | Breakfast | Lunch | Snack | Dinner | Total |
|---|---|---|---|---|---|
| Calories | 205 | 327 | 207 | 568 | 1357 (a) |
| Protein (g) | 10 | 25 | 15 | 35 | 85 |
| Carbohydrate (g) | 30 | 50 | 30 | 80 | 190 |
| Fat (g) | 5 | 3 | 3 | 12 | 23 |
| Fiber (g) | 10 | 8 | — | + |  |

*Vitamins and Minerals: to be provided as multi vitamin/mineral pill
+ based on food choices of subjects
(a) salad and no calorie vegetables not included Accordingly, a test of the pre-consumption and post-consumption Tp/Lnaa ratios of individuals subscribing to either the weight loss plan of the present invention or the control diet plan showed a marked difference in the post-consumption plasma Tp/Lnaa ratio relative to pre-consumption plasma levels only in individuals subscribing to the weight loss plan of the present invention.

Thus, a blood sample was taken from each individual 90 minutes after consumption of test snack, which test snack had been consumed three hours after the test lunch. The same blood analysis was performed on blood samples taken from individuals who had consumed the control lunch and control snack composition. The results of the blood analyses are shown in Table 3, below.

TABLE 3

| Pre- and Post-Consumption Plasma Tp/Lnaa Ratios After Consuming Test or Control Snack | | | |
|---|---|---|---|
| Group | Pre | Post | Increase |
| Test | 0.094 ± 0.003 | 0.111 ± 0.004 | 0.017 |
| Control | 0.087 ± 0.006 | 0.086 ± 0.004 | None |

Hence, the test group experienced a significant increase in its post-consumption plasma Tp/Lnaa ratio compared to that of the control group, which experienced no increase in the plasma Tp/Lnaa levels.

As an apparent consequence of the higher Tp/Lnaa ratio after consumption of the combined lunch or dinner and snack, although applicants do not wish to be limited by this theory, the test group also experienced a decrease in carbohydrate craving after consumption of the test meals. Subjects filled out a weekly self-report assessing, on a 10 point scale, their cravings for protein, carbohydrate, fat fruits and vegetables during the previous week. Only cravings for carbohydrate-rich foods were noted. Over the entire 7 week study the average rating of carbohydrate craving as compared to baseline decreased by 1.8 among the test subjects but did not change from baseline among the control subjects.

Thus, the weight loss plan of the present invention provides a statistically significant increase in the post-consumption plasma Tp/Lnaa ratio compared to the control group, as well as a statistically significant decrease in the carbohydrate craving of the test group relative to the control group. Such benefits were provided by the test compositions of the present invention, which allocated the daily carbohydrate and protein intake differently from existing diet plan compositions to ensure that the ratio of plasma tryptophan to that of circulating amino acids is elevated sufficiently to increase tryptophan uptake into the brain following consumption of the test lunch or dinner and the test snack.

As for weight loss, the subjects were treated with the test or control diets for 7 weeks following a mixed nutrient, traditional food, calorie deficient diet for 3 weeks. Baseline weight was established after this 3 week run-in period, immediately before the subjects started the test or control diets. In the test diet group weight went from 181.7±2.6 pounds to a final weight of 177.0±1.1 pounds (21 completers out of 33) ($p<0.0001$) and from 187.2±3.3 to 183.0±1.4 pounds (19 completers out of 30) ($p<0.0011$) on the control diet. When the distribution of weight loss was analyzed, the test group enjoyed a substantially higher decrease in weight versus the control group.

In a separate study, two groups of individuals subscribed separately to the test weight loss plan and the control weight loss plan. It was found that, on average, both groups lost about 4 pounds over the course of the study. On breaking down the results of the study, however, it was discovered that the weight loss distribution differed between the two groups as well.

As illustrated in FIG. 1, 7 individuals in the control group lost less than 2 pounds, 3 individuals lost between 2–4 pounds, 6 individuals lost between 4–9 pounds, and 3 individuals lost greater than 10 pounds. For the test group, no individuals lost less than 2 pounds, but 7 individuals lost 2–4 pounds, 11 individuals lost between 4–9 pounds, and 2 individuals lost more than 10 pounds. Hence, in the test group, a total of 18 individuals lost between 2–9 pounds (moderate weight loss) while, in the control group, only 9 individuals lost a comparable amount of weight.

Presented another way, as shown in FIG. 2, individuals participating in the control group experienced a more variable inconsistent distribution of weight loss with most individuals losing either less than 2 pounds, while relatively few individuals lost between 2–4 pounds and over 10 pounds. In contrast, the majority of the participants of the weight loss plan of the present invention enjoyed a weight loss in the moderate range of between 2–9 pounds. It is thus apparent that the present invention provides both a greater net loss of weight, and even in those situations where a collection of individuals may lose a comparable amount of weight between the test group and the control group, the weight loss plan of the present invention provides for a more desirable Gaussian distribution of weight loss among the population of individuals participating in the weight loss diet plan.

The present invention, thus, provides broadly for an article of manufacture, kit, or package comprising a plurality of food compositions for consumption in connection with a weight loss diet plan, including at least one breakfast composition, at least one lunch or dinner composition, and at least one snack composition, the breakfast composition comprising (a) at least one form of carbohydrate, and (b) at least one form of protein, the weight ratio in the breakfast composition of the total amount of carbohydrate to the total amount of protein ranging from about 1:10 to about 1:1; the lunch or dinner composition comprising (a) at least one form of carbohydrate, and (b) at least one form of protein, the weight ratio in the composition of the total amount of carbohydrate to the total amount of protein ranging from about 4:1 to about 10:1; and the snack composition comprising at least one form of carbohydrate and being substantially free of protein.

Preferably, the breakfast composition contains a CHO:protein weight ratio of about 1:5 to about 5:1, more preferably about 1:2 to about 2:1, and most preferably about 1:1. Also, the lunch and/or dinner compositions should preferably contain a CHO:protein weight ratio of about 5:1 or higher, more preferably 7:1 or higher, and most preferably 10:1 or higher. The snack composition should be substantially free of protein, as stated above, and may include complex carbohydrates, simple sugars or both.

In a particular embodiment of the invention, the claimed package includes a breakfast composition that has a caloric content ranging from about 200 to about 400 calories, preferably, from about 250 to about 350 calories, and most preferably, from about 300 to about 325 calories. Its protein content can range from about 20 to about 50 grams, preferably about 25 to about 45 grams, most preferably about 30 grams. Its carbohydrate content can range from about 20 to about 60 grams, preferably about 30 to about 50 grams, most preferably about 40 grams. In addition, the breakfast composition of the present invention may also provide about 0 to about 10 grams of fat, preferably, about 0 to about 5 grams, most preferably, about 0 to about 2 grams, and about 0 to about 20 grams of fiber, preferably, about 1 to about 15, and most preferably, about 5 to about 10 grams.

In a particular embodiment of the invention, the claimed package includes a lunch or dinner composition that has a caloric content ranging from about 300 to about 500 calories, preferably, from about 325 to about 475 calories, and most preferably, from about 350 to about 425 calories. Its protein content can range from about 5 to about 35 grams, preferably about 5 to about 30 grams, most preferably about 10 to about 20 grams. Its carbohydrate content can range from about 50 to about 90 grams, preferably about 60 to about 80 grams, most preferably about 70 grams. In addition, the lunch or dinner composition of the present invention may also provide about 0 to about 15 grams of fat, preferably, about 3 to about 12 grams, most preferably, about 5 to about 8 grams, and about 0 to about 20 grams of fiber, preferably, about 1 to about 15, and most preferably, about 5 to about 10 grams.

In a particular embodiment of the invention, the claimed package includes a snack composition that has a caloric content ranging from about 150 to about 250 calories, preferably, from about 175 to about 225 calories, and most preferably, from about 200 to about 225 calories. Its protein content should be substantially zero. Its carbohydrate content can range from about 30 to about 80 grams, preferably about 40 to about 60 grams, most preferably about 45 grams. In addition, the snack composition of the present invention may also provide about 0 to about 5 grams of fat, preferably, about 0 to about 3 grams, most preferably, about 1–2 grams, and about 0 to about 20 grams of fiber, preferably, about 1 to about 15, and most preferably, about 5 to about 10 grams.

Excluding the optional traditional meal, a preferred package of the invention should provide a caloric content ranging from about 700 to about 1200 calories. Furthermore, the package of the invention should preferably also provide instructions for the caloric and nutritional content of an optional traditional meal to be consumed for either lunch or dinner. With the optional traditional meal, the total caloric intake should not exceed about 1800 calories, preferably 1600 calories, more preferably 1400 calories, and most preferably, 1200 calories.

The carbohydrates used in the present invention should preferably have a glycemic index higher than fructose. Suitable carbohydrates (CHO) include, but are not limited to, dextrose, sucrose, maltose, maltodextrin or polycose.

The present invention also provides a method of losing weight comprising substantially limiting an individual's daily caloric intake to no more than about 1600 calories, which calories are provided by at least some form of carbohydrate intake and at least some form of protein intake, provided that about 40 percent or more of the protein intake is consumed at breakfast, preferably 50 percent, more preferably 60, and most preferably 75 percent.

The methods of the present invention are particularly well suited for promoting weight loss by substantially limiting an individual's daily food intake to the contents of a package comprising a plurality of food compositions including at least one breakfast composition, at least one lunch or dinner composition, and at least one snack composition, the breakfast composition comprising (a) at least one form of carbohydrate, and (b) at least one form of protein, the weight ratio in the breakfast composition of the total amount of carbohydrate to the total amount of protein ranging from about 1:10 to about 1:1; the lunch or dinner composition comprising (a) at least one form of carbohydrate, and (b) at least one form of protein, the weight ratio in the composition of the total amount of carbohydrate to the total amount of protein ranging from about 4:1 to about 10:1; and the snack composition comprising at least one form of carbohydrate and being substantially free of protein, and, optionally, a traditional meal of a prescribed range of caloric and nutritional content to be consumed either at lunch or dinner, the contents of the package providing, along with the optional traditional meal, a daily caloric intake falling within a predetermined range, say about 1200 to about 1800, preferably, about 1200 to about 1600, more preferably, about 1300 to about 1400.

Consistent with the objectives of the present invention, a method is also provided for achieving a more Gaussian distribution of weight loss among a population of individuals participating in a weight loss diet plan comprising providing to each individual of the population a package comprising a plurality of food compositions including at least one breakfast composition, at least one lunch or dinner composition, and at least one snack composition, the breakfast composition comprising (a) at least one form of carbohydrate, and (b) at least one form of protein, the weight ratio in the breakfast composition of the total amount of carbohydrate to the total amount of protein ranging from about 1:10 to about 1:1; the lunch or dinner composition comprising (a) at least one form of carbohydrate, and (b) at least one form of protein, the weight ratio in the composition of the total amount of carbohydrate to the total amount of protein ranging from about 4:1 to about 10:1; and the snack composition comprising at least one form of carbohydrate and being substantially free of protein, each individual to limit substantially his or her daily food intake to the contents of the package, and, optionally, a traditional meal of a prescribed range of caloric and nutritional content to be consumed either at lunch or dinner, the contents of the package providing, along with the optional traditional meal, a daily caloric intake falling within a predetermined range.

And in yet another application of the present invention, a method is provided for inhibiting the carbohydrate craving of an individual participating in a weight loss diet plan comprising limiting substantially an individual's daily food intake to a plurality of packaged compositions comprising at least one breakfast composition, at least one lunch composition, and at least one snack composition, the breakfast composition comprising (a) at least one form of carbohydrate, and (b) at least one form of protein, the weight ratio in the breakfast composition of the total amount of carbohydrate to the total amount of protein ranging from about 1:10 to about 1:1; the lunch or dinner composition comprising (a) at least one form of carbohydrate, and (b) at least one form of protein, the weight ratio in the composition of the total amount of carbohydrate to the total amount of protein ranging from about 4:1 to about 10:1; and the snack composition comprising at least one form of carbohydrate and being substantially free of protein, and, optionally, a traditional meal of a prescribed range of caloric and nutritional content consistent with a dietary weight loss plan to be consumed either at lunch or dinner, the contents of the plurality of packaged compositions providing, along with the optional traditional meal, a fixed daily caloric intake falling within a predetermined range.

The following examples are further provided.

VI. EXAMPLES

Sixty-two women weighing between 40–60 pounds above medically desirable weight were recruited to enter a 7-week weight loss study. All the subjects were first subjected to a 3 week run-in period in which they received nutritional information and a low fat diet to eliminate the effect of participation in a weight loss plan from the effect of the weight loss intervention itself. After this three week run-in period, the subjects were assigned randomly to one of two isocaloric formula diets.

Both diets provided approximately 1350 calories daily. The control diet followed the dietary guidelines and nutrient composition of Ultra Slim Fast™. Briefly, the control diet contained approximately 3 parts carbohydrate to one part protein at every meal and snack. The experimental/test plan of the present invention allocated the amounts of protein and carbohydrate differently at each meal and snack to ensure that following the lunch and dinner meals, the ratio of plasma tryptophan to that of the circulating large neutral amino acids was not decreased so that the ratio would be significantly elevated following the consumption of the carbohydrate-rich snack.

The breakfast, lunch, and snack meals were provided in powder form and reconstituted with either water, diet soda, or coffee. The dinner meal was composed of traditional foods but the subjects were given strict guidelines that restricted their food choices at this optional traditional dinner meal according to the guidelines of each diet plan. The study was carried out in a double blind format. Each of the subjects were weighed weekly, had their blood pressure, moods, cravings, and ability to adhere to the diet plan monitored. Twenty-one out of 33 subjects on the experimental diet plan completed the study, whereas 19 out of 30 completed the control diet plan. Both groups lost weight as a whole.

|  | Baseline Weight | Final Weight |
| --- | --- | --- |
| Experimental Diet | 181 ± 2.62 | 177 ± 1.10 (P < 0.0001)* |
| Control Diet | 187 ± 3.3 | 183 ± 1.44 (P < 0.0011)* |

The distribution of weight loss differed significantly, however, as discussed above and illustrated in the figures.

Changes in the mood of each subject over the 7-week study was also monitored using the Profile of Mood States, which is a self-rating form describing several mood states. McNair, D., et al., in *Profile of Mood States (Manual)*, San Diego, Calif. Educational Testing Service (1971) pp. 5–29.

It was also found that there was a significant difference in the overall rating of vigor between the two groups, the experimental group rating themselves as significantly more vigorous (p0.03) than the control group using an Analysis of Variance to do the analyses.

A typical snack composition may include maltodextrin (35 grams), dextrose (14.5 grams), Penplus UM Starch (3.0 grams), malic acid, fine granular (1.4 grams), H&R Orange (90 milligrams), WJ Yellow No. 6 (30 milligrams), Niacinamide (5.0 milligrams), calcium, and pantothenate (2.5 milligrams), calcium (500 milligrams), and magnesium (200 milligrams). The snack composition, as well as the other food compositions, may also contain vitamins A, D, E, B-1, B-2, B-6, B-12, and C. The snack composition may also contain added fiber (e.g., circa 10 grams of methylcellulose or the like).

The composition of additional packaged products are also provided below:

EXAMPLE 1 OF PRODUCT COMPOSITIONS
UNDER THE WEIGHT LOSS DIET PLAN OF
THE PRESENT INVENTION

|  | Breakfast | Lunch | Snack | Dinner | Total |
| --- | --- | --- | --- | --- | --- |
| Calories | 270 | 525 | 254 | 550 | 1600 |
| Protein (g) | 25 | 15 | — | 10.5 | 50.5 |
| Carbohydrate (g) | 31 | 105 | 50 | 100 | 286 |
| Fat (g) | 5 | 5 | 6 | 12 | 28 |
| Fiber (g) | 10 | 8 | — | 10 | 28 |

EXAMPLE 2 OF PRODUCT COMPOSITIONS
UNDER THE WEIGHT LOSS DIET PLAN OF
THE PRESENT INVENTION

|  | Breakfast | Lunch | Snack | Dinner | Total |
| --- | --- | --- | --- | --- | --- |
| Calories | 240 | 352 | 178 | 430 | 1200 |
| Protein (g) | 30 | 10 | — | 10 | 50 |
| Carbohydrate (g) | 30 | 70 | 40 | 70 | 210 |
| Fat (g) | 5 | 3 | 2 | 12 | 22 |
| Fiber (g) | 10 | 8 | — | 10 | 28 |

EXAMPLE 3 OF PRODUCT COMPOSITIONS
UNDER THE WEIGHT LOSS DIET PLAN OF
THE PRESENT INVENTION

|  | Breakfast | Lunch | Snack | Dinner | Total |
|---|---|---|---|---|---|
| Calories | 315 | 350 | 225 | 550 | 1450 |
| Protein (g) | 30 | 10 | — | 15 | 55 |
| Carbohydrate (g) | 40 | 70 | 45 | 105 | 260 |
| Fat (g) | 4 | 3 | 5 | 8 | 20 |
| Fiber (g) | 10 | 8 | — | 8 | 26 |

EXAMPLE 4 OF PRODUCT COMPOSITIONS
UNDER THE WEIGHT LOSS DIET PLAN OF
THE PRESENT INVENTION

|  | Breakfast | Lunch | Snack | Dinner | Total |
|---|---|---|---|---|---|
| Calories | 300 | 331 | 219 | 550 | 1400 |
| Protein (g) | 35 | 10 | — | 15 | 57 |
| Carbohydrate (g) | 35 | 70 | 48 | 105 | 238 |
| Fat (g) | 2 | 11 | 3 | 8 | 24 |
| Fiber (g) | 10 | 10 | — | 10 | 30 |

EXAMPLE 5 OF PRODUCT COMPOSITIONS
UNDER THE WEIGHT LOSS DIET PLAN OF
THE PRESENT INVENTION

|  | Breakfast | Lunch | Snack | Dinner | Total |
|---|---|---|---|---|---|
| Calories | 225 | 385 | 180 | 510 | 1300 |
| Protein (g) | 30 | 10 | — | 15 | 55 |
| Carbohydrate (g) | 20 | 70 | 40 | 105 | 235 |
| Fat (g) | 3 | 7 | 2 | 3 | 15 |
| Fiber (g) | 8 | 10 | — | 10 | 28 |

Accordingly, it should be apparent to one of ordinary skill in the art that other embodiments of the present invention can be made without departing significantly from the scope and spirit of the disclosed invention, which invention should not be construed as being limited to any of the specific examples provided, and which invention is limited only by the claims that follow.

COMPOSITIONS AND METHODS FOR LOSING WEIGHT

What is claimed is:

1. A package comprising a plurality of food compositions for consumption in connection with a weight loss diet plan, including at least one breakfast composition, at least one lunch or dinner composition, and at least one snack composition, said breakfast composition comprising (a) at least one form of carbohydrate, and (b) at least one form of protein, the weight ratio in said breakfast composition of the total amount of carbohydrate to the total amount of protein ranging from about 1:10 to about 1:1; said lunch or dinner composition comprising (a) at least one form of carbohydrate, and (b) at least one form of protein, the weight ratio in the composition of the total amount of carbohydrate to the total amount of protein ranging from about 4:1 to about 10:1; and said snack composition comprising at least one form of carbohydrate and being substantially free of protein.

2. The package of claim 1 in which said breakfast composition has a caloric content ranging from about 200 to about 400 calories.

3. The package of claim 1 in which said lunch or dinner composition has a caloric content ranging from about 300 to about 500 calories.

4. The package of claim 1 in which said snack composition has a caloric content ranging from about 150 to about 250 calories.

5. The package of claim 1 having a total caloric content ranging from about 700 to about 1200 calories.

6. The package of claim 1 which further comprises instructions for the caloric and nutritional content of an optional meal to be consumed for either lunch or dinner.

7. The package of claim 1 in which at least one of said compositions further comprises a predetermined amount of fat.

8. The package of claim 1 in which at least one of said compositions further comprises a predetermined amount of fiber.

9. The package of claim 1 which provides a total caloric intake not exceeding about 1600 calories, including an optional fourth meal.

10. The package of claim 1 in which at least one of said carbohydrates has a glycemic index higher than the glycemic index of fructose.

11. The package of claim 1 in which at least one of said carbohydrates is selected from the group consisting of dextrose, sucrose, maltose, maltodextrin or polycose.

12. The package of claim 1 in which at least one of said proteins comprises a high quality protein derived from an animal source.

13. The package of claim 12 wherein said high quality protein derived from an animal source is selected from the group consisting of casein, albumin and whey.

14. The package of claim 1 in which at least one of said compositions is in the form of a powder.

15. The package of claim 1 in which at least one of said compositions is in the form of a liquid.

16. The package of claim 1 in which at least one of said compositions is in the form of a food bar, a pudding or a soup.

17. The package of claim 1 in which said breakfast composition does not elevate post-consumption plasma tryptophan/large neutral amino acid ratio relative to pre-consumption levels.

18. The package of claim 1 in which said non-breakfast compositions maintain or elevate post-plasma tryptophan/large neutral amino acid ratio relative to pre-consumption levels.

19. The package of claim 18 in which the composition of the lunch or dinner meal is such that on consumption of the snack, said post-consumption plasma tryptophan/large neutral amino acid ratio is elevated by about 10 percent or more relative to pre-consumption levels.

20. The package of claim 18 in which the composition of the lunch or dinner meal is such that on consumption of the snack, said post-consumption plasma tryptophan/large neutral amino acid ratio is elevated by about 20 percent or more relative to pre-consumption levels.

21. The package of claim 1 in which said breakfast composition provides about 40 percent or more of the daily protein intake.

22. A method of losing weight comprising substantially limiting an individual's daily caloric intake to about 1600 calories or less, which calories are provided by at least some form of carbohydrate intake and at least some form of protein intake, provided that about 40 percent or more of said protein intake is consumed at breakfast.

23. The method of claim 22 in which said daily caloric intake is divided among meals at breakfast, lunch, snack, and dinner.

24. The method of claim 23 in which said breakfast meal does not elevate the post-consumption plasma tryptophan/large neutral amino acid ratio relative to pre-consumption levels.

25. The method of claim 23 in which said non-breakfast meals maintain or elevate the post-consumption plasma tryptophan/large neutral amino acid ratio relative to pre-consumption levels.

26. A method of losing weight comprising substantially limiting an individual's daily food intake to the contents of a package comprising a plurality of food compositions including at least one breakfast composition, at least one lunch or dinner composition, and at least one snack composition, said breakfast composition comprising (a) at least one form of carbohydrate, and (b) at least one form of protein, the weight ratio in said breakfast composition of the total amount of carbohydrate to the total amount of protein ranging from about 1:10 to about 1:1;

said lunch or dinner composition comprising (a) at least one form of carbohydrate, and (b) at least one form of protein, the weight ratio in the composition of the total amount of carbohydrate to the total amount of protein ranging from about 4:1 to about 10:1; and said snack composition comprising at least one form of carbohydrate and being substantially free of protein, and, optionally, a traditional meal of a prescribed range of caloric and nutritional content to be consumed either at lunch or dinner, the contents of said package providing, along with said optional traditional meal, a daily caloric intake falling within a predetermined range.

27. A method of achieving a Gaussian distribution of weight loss among a population of individuals participating in a weight loss diet plan comprising providing to each individual of said population a package comprising a plurality of food compositions including at least one breakfast composition, at least one lunch or dinner composition, and at least one snack composition, said breakfast composition comprising (a) at least one form of carbohydrate, and (b) at least one form of protein, the weight ratio in said breakfast composition of the total amount of carbohydrate to the total amount of protein ranging from about 1:10 to about 1:1;

said lunch or dinner composition comprising (a) at least one form of carbohydrate, and (b) at least one form of protein, the weight ratio in the composition of the total amount of carbohydrate to the total amount of protein ranging from about 4:1 to about 10:1; and said snack composition comprising at least one form of carbohydrate and being substantially free of protein, each individual to limit substantially his or her daily food intake to the contents of said package, and, optionally, a traditional meal of a prescribed range of caloric and nutritional content to be consumed either at lunch or dinner, the contents of said package providing, along with said optional traditional meal, a daily caloric intake falling within a predetermined range.

28. A method of effecting weight loss comprising limiting substantially an individual's daily food intake to a plurality of packaged compositions comprising at least one breakfast composition, at least one lunch composition, and at least one snack composition, said breakfast composition comprising (a) at least one form of carbohydrate, and (b) at least one form of protein, the weight ratio in said breakfast composition of the total amount of carbohydrate to the total amount of protein ranging from about 1:10 to about 1:1;

said lunch or dinner composition comprising (a) at least one form of carbohydrate, and (b) at least one form of protein, the weight ratio in the composition of the total amount of carbohydrate to the total amount of protein ranging from about 4:1 to about 10:1; and said snack composition comprising at least one form of carbohydrate and being substantially free of protein, and, optionally, a traditional meal of a prescribed range of caloric and nutritional content to be consumed either at lunch or dinner, the contents of said plurality of packaged compositions providing, along with said optional traditional meal, a daily caloric intake falling within a predetermined range.

29. The method of claim 28 such that the consumption of said breakfast composition does not elevate the individual's post-consumption plasma tp/lnaa ratio relative to that individual's pre-consumption plasma tp/lnaa ratio.

30. The method of claim 28 such that the consumption of said non-breakfast compositions either maintains or elevates the individual's post-consumption plasma tp/lnaa ratio relative to that individual's pre-consumption plasma tp/lnaa ratio.

31. The method of claim 30 in which said elevation enhances the uptake of tryptophan into the individual's brain.

32. A method of inhibiting the carbohydrate craving of an individual participating in a weight loss diet plan comprising limiting substantially an individual's daily food intake to a plurality of packaged compositions comprising at least one breakfast composition, at least one lunch composition, and at least one snack composition, said breakfast composition comprising (a) at least one form of carbohydrate, and (b) at least one form of protein, the weight ratio in said breakfast composition of the total amount of carbohydrate to the total amount of protein ranging from about 1:10 to about 1:1;

said lunch or dinner composition comprising (a) at least one form of carbohydrate, and (b) at least one form of protein, the weight ratio in the composition of the total amount of carbohydrate to the total amount of protein ranging from about 4:1 to about 10:1; and said snack composition comprising at least one form of carbohydrate and being substantially free of protein, and, optionally, a traditional meal of a prescribed range of caloric and nutritional content to be consumed either at lunch or dinner, the contents of said plurality of packaged compositions providing, along with said optional traditional meal, a daily caloric intake falling within a predetermined range.

33. The package of claim 1 which provides a total caloric intake of from about 1100 to about 1900 calories, including an optional fourth meal.

* * * * *